US009230186B2

(12) United States Patent
Ozawa et al.

(10) Patent No.: US 9,230,186 B2
(45) Date of Patent: *Jan. 5, 2016

(54) IMAGE PROCESSING DEVICE GENERATING BINARY IMAGE DATA BY SELECTING SPECIFIC COMPONENT

(71) Applicant: BROTHER KOGYO KABUSHIKI KAISHA, Nagoya, Aichi (JP)

(72) Inventors: Ryohei Ozawa, Nagoya (JP); Masaki Kondo, Toyoake (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/777,311

(22) Filed: Feb. 26, 2013

(65) Prior Publication Data

US 2013/0259363 A1    Oct. 3, 2013

(30) Foreign Application Priority Data

Mar. 30, 2012    (JP) ................................. 2012-081492

(51) Int. Cl.
*G06K 9/46*     (2006.01)
*G06K 9/00*     (2006.01)
*G06K 9/38*     (2006.01)

(52) U.S. Cl.
CPC .......... *G06K 9/4652* (2013.01); *G06K 9/00456* (2013.01); *G06K 9/38* (2013.01); *G06K 2209/01* (2013.01)

(58) Field of Classification Search
CPC ... G06K 9/00456; G06K 9/38; G06K 9/4652; G06T 11/001
USPC .......... 382/162, 164, 254, 276, 300; 348/589, 348/467, 555, 557; 235/379, 375
See application file for complete search history.

(56) References Cited

U.S. PATENT DOCUMENTS 6,115,498 A  *  9/2000  Ro ........................ G06T 11/001
                                              345/469
6,883,707 B2 *  4/2005  Nagasaka ............ G06K 9/2018
                                              235/375

(Continued)

FOREIGN PATENT DOCUMENTS

JP      H9-097309 A     4/1997
JP      H11-312218 A    11/1999

(Continued)

OTHER PUBLICATIONS

U.S. Appl. No. 13/777,431, filed Feb. 26, 2013.

(Continued)

*Primary Examiner* — Mekonen Bekele
(74) *Attorney, Agent, or Firm* — Scully, Scott, Murphy & Presser, PC

(57) ABSTRACT

An image processing device includes a processor configured to perform: acquiring target image data representing a target image; and generating binary image data representing the letter in the target image by using the target image data. The generating of the binary image data comprises: identifying a background color value representing color of background of the target image; identifying a letter color value representing color of the letter in the target image; acquiring a difference between the background color value and the letter color value, the difference including a plurality of component differences; selecting one specific component image data corresponding to a specific component from among the plurality of components, the specific component corresponding to a maximum component difference among the plurality of component differences; and performing a binarizing process on the selected one specific component image data to generate one binary image data.

10 Claims, 14 Drawing Sheets

(56) References Cited

U.S. PATENT DOCUMENTS

| | | |
|---|---|---|
| 7,426,291 B2 | 9/2008 | Okamura |
| 8,014,574 B2 | 9/2011 | Hara |
| 8,213,735 B2 | 7/2012 | Cooksey et al. |
| 8,290,213 B2 * | 10/2012 | Chen et al. ............... 382/105 |
| 8,837,836 B2 * | 9/2014 | Kondo et al. .............. 382/195 |
| 2001/0028737 A1 | 10/2001 | Takakura et al. |
| 2004/0238619 A1 * | 12/2004 | Nagasaka ......... G06K 9/2018 235/379 |
| 2005/0180645 A1 * | 8/2005 | Hasegawa ........ G06K 9/00456 382/239 |
| 2006/0039608 A1 | 2/2006 | Nishida |
| 2009/0175534 A1 * | 7/2009 | Itoh ..................... G06K 9/38 382/162 |
| 2009/0268973 A1 | 10/2009 | Majewicz |
| 2010/0220927 A1 | 9/2010 | Kim et al. |
| 2011/0135156 A1 * | 6/2011 | Chen et al. ............... 382/105 |
| 2013/0028518 A1 * | 1/2013 | Ozawa et al. ............. 382/173 |
| 2013/0028520 A1 * | 1/2013 | Kondo et al. ............. 382/195 |
| 2013/0044952 A1 * | 2/2013 | Du ..................... G06K 9/38 382/170 |
| 2013/0106897 A1 * | 5/2013 | Zhao ................... G09G 5/22 345/589 |
| 2013/0257892 A1 * | 10/2013 | Ozawa et al. ............. 345/589 |
| 2013/0259363 A1 | 10/2013 | Ozawa et al. |

FOREIGN PATENT DOCUMENTS

| | | |
|---|---|---|
| JP | 2000-333022 A | 11/2000 |
| JP | 2001-298625 A | 10/2001 |
| JP | 2004-199622 A | 7/2004 |
| JP | 2005-208820 A | 8/2005 |
| JP | 2006-085665 A | 3/2006 |
| JP | 2009-017247 A | 1/2009 |
| WO | 2006/066325 A1 | 6/2006 |
| WO | WO 2011157250 A2 * | 12/2011 ............... G06F 3/14 |

OTHER PUBLICATIONS

Sauvola, J., et al., "Adaptive document image binarization", Pattern Recognition, Feb. 1, 2000, vol. 33, No. 2, pp. 225-236.

Extended European Search Report dated Feb. 24, 2015 from related European Application No. 13 15 6806.5.

Official Action dated Dec. 5, 2014 from related U.S. Appl. No. 13/777,431.

Notice of Allowance dated Mar. 31, 2015 from related U.S. Appl. No. 13/777,431.

Japanese Office Action dated Oct. 27, 2015 from related Japanese Patent Application No. 2012-081493, together with a partial English language translation.

Japanese Office Action dated Oct. 20, 2015 from related Japanese Patent Application No. 2012-081492, together with a partial English language translation.

* cited by examiner

FIG. 9

| DISTRIBUTION WIDTH W | COLOR NUMBER C | PIXEL DENSITY D | RESULTS OF ATTRIBUTE IDENTIFICATION |
|---|---|---|---|
| GREATER THAN OR EQUAL TO Wth | GREATER THAN OR EQUAL TO Cth | GREATER THAN OR EQUAL TO Dth | PHOTO |
| | | SMALLER THAN Dth | PHOTO |
| | SMALLER THAN Cth | GREATER THAN OR EQUAL TO Dth | DRAWING |
| | | SMALLER THAN Dth | TEXT |
| SMALLER THAN Wth | GREATER THAN OR EQUAL TO Cth | GREATER THAN OR EQUAL TO Dth | PHOTO |
| | | SMALLER THAN Dth | TEXT |
| | SMALLER THAN Cth | GREATER THAN OR EQUAL TO Dth | DRAWING |
| | | SMALLER THAN Dth | TEXT |

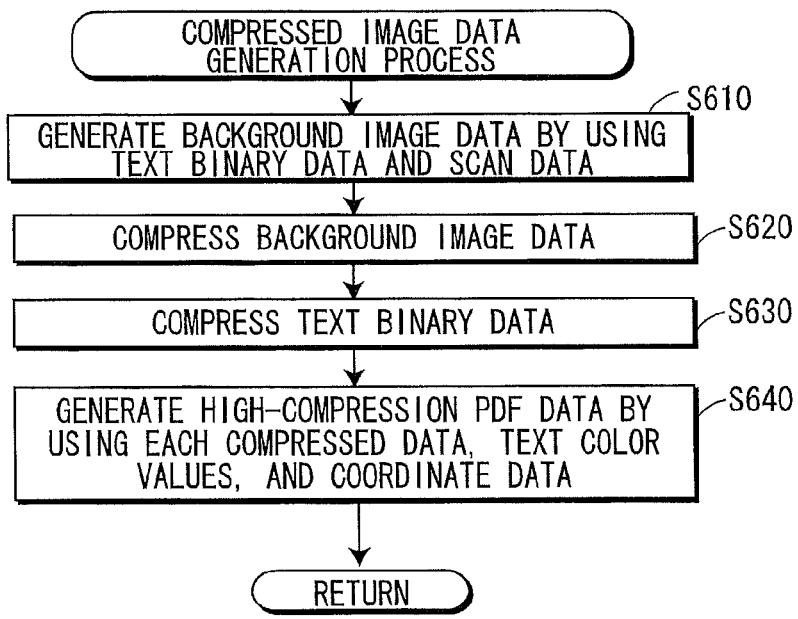

FIG. 10

FIG. 11 (A)
BACKGROUND IMAGE (256 GRADATION LEVELS)
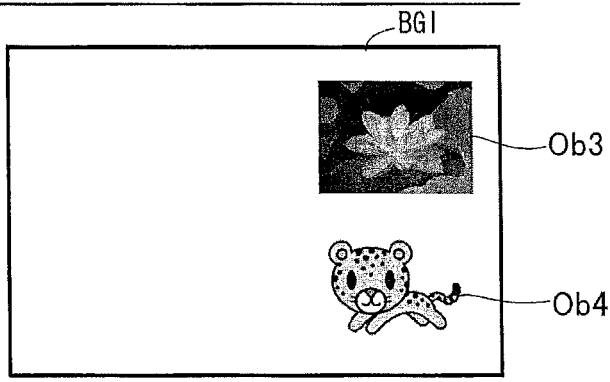
FIG. 11 (B)
TEST IMAGES (2 GRADATION LEVELS)
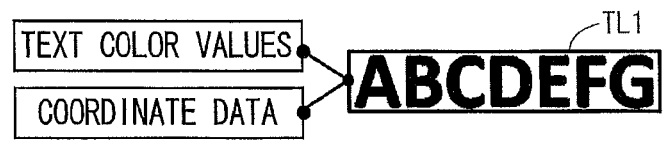
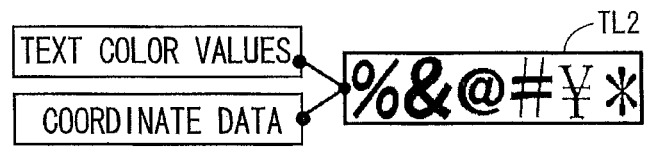
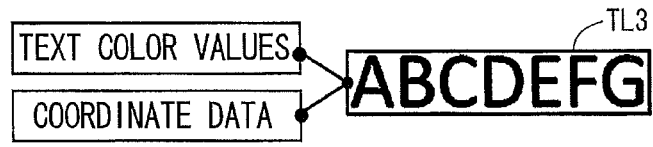

FIG. 15
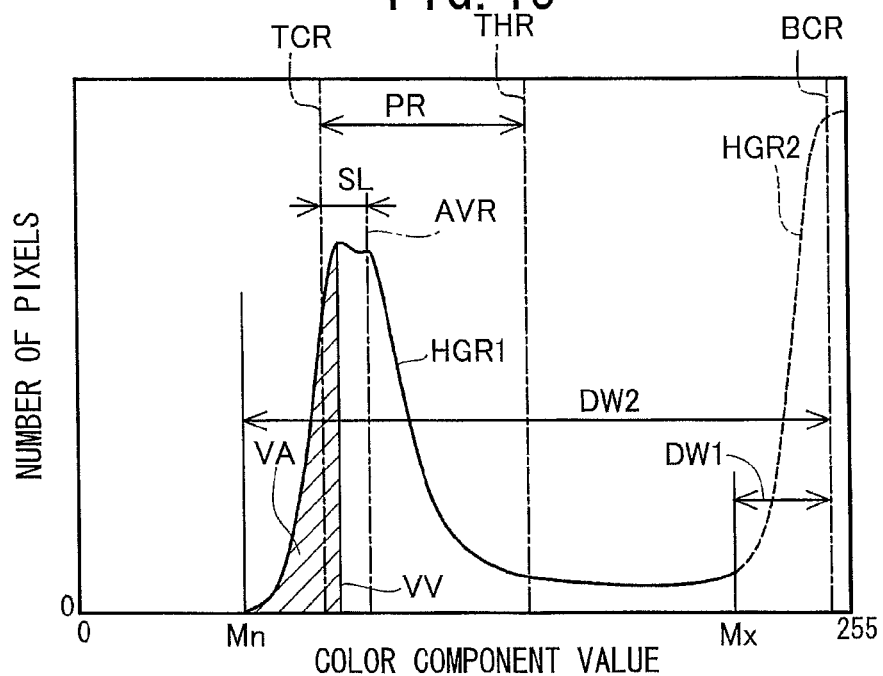
FIG. 16(A) R COMPONENT
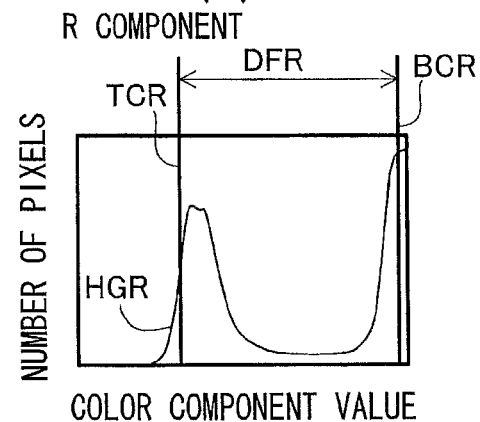
FIG. 16(B) G COMPONENT
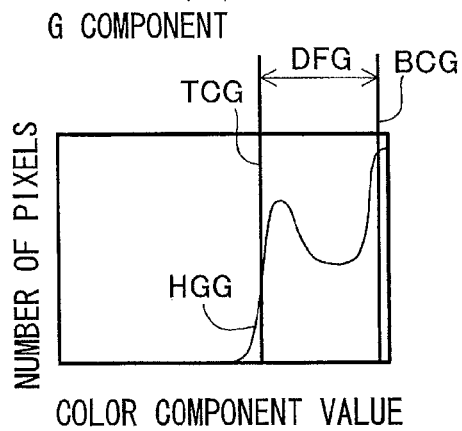
FIG. 16(C) B COMPONENT
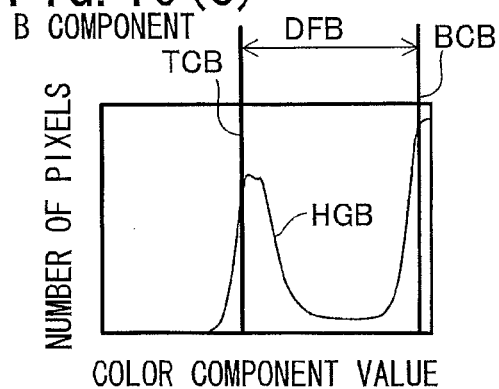

EMBODIMENT

FIRST COMPARATIVE EXAMPLE

SECOND COMPARATIVE EXAMPLE

SHARPNESS IS LOW (BLURRINESS IS HIGH)

SHARPNESS IS HIGH (BLURRINESS IS LOW)

IMAGE PROCESSING DEVICE GENERATING BINARY IMAGE DATA BY SELECTING SPECIFIC COMPONENT

CROSS REFERENCE TO RELATED APPLICATION

This application claims priority from Japanese Patent Application No. 2012-081492 filed Mar. 30, 2012. The entire content of the priority application is incorporated herein by reference.

TECHNICAL FIELD

The present invention relates to an image process for processing image data representing images that include text.

BACKGROUND

There has been a need for a technology to generate binary image data that can suitably render text from target image data representing a target image that includes text. This binary image data is useful for compressing the target image data and for performing character recognition processes (OCR). One such technique known in the art converts RGB image data to binary values for each color component and produces binary image data by acquiring the logical sum (inclusive OR) of the binary data for the three color components.

SUMMARY

However, the conventional technology does not give sufficient consideration to setting threshold values used in the thresholding process. If suitable threshold values are not set, then suitable binary image data for rendering text cannot be generated.

Therefore, the primary object of the present invention is to provide a new technology capable of producing suitable binary image data for rendering text from image data representing an image that includes text.

In order to attain the above and other objects, the invention provides an image processing device comprising: a processor to perform: a processor configured to perform: acquiring target image data representing a target image including a letter, the target image data including a plurality of component image data corresponding respectively to a plurality of components constituting a color coordinate system; and generating binary image data representing the letter in the target image by using the target image data, the generating of the binary image data comprising: identifying a background color value representing color of background of the target image, the background color value being composed of values for the plurality of components; identifying a letter color value representing color of the letter in the target image, the letter color value being composed of values for the plurality of components; acquiring a difference between the background color value and the letter color value, the difference including a plurality of component differences corresponding respectively to the plurality of components; selecting, from among the plurality of component image data, one specific component image data corresponding to a specific component from among the plurality of components, the specific component corresponding to a maximum component difference among the plurality of component differences; and performing a binarizing process on the selected one specific component image data to generate one binary image data.

According to another aspect, the present invention provides a computer-readable storage medium storing computer-readable instructions that, when executed by a processor, causes an image processing device to perform: acquiring target image data representing a target image including a letter, the target image data including a plurality of component image data corresponding respectively to a plurality of components constituting a color coordinate system; and generating binary image data representing the letter in the target image by using the target image data, the generating of the binary image data comprising: identifying a background color value representing color of background of the target image, the background color value being composed of values for the plurality of components; identifying a letter color value representing color of the letter in the target image, the letter color value being composed of values for the plurality of components; acquiring a difference between the background color value and the letter color value, the difference including a plurality of component differences corresponding respectively to the plurality of components; selecting, from among the plurality of component image data, one specific component image data corresponding to a specific component from among the plurality of components, the specific component corresponding to a maximum component difference among the plurality of component differences; and performing a binarizing process on the selected one specific component image data to generate one binary image data.

BRIEF DESCRIPTION OF THE DRAWINGS

In the drawings:

FIG. 9 is an example of a determination table;

FIG. 10 is a flowchart illustrating steps in a compressed image data generation process;

FIG. 11(A) is an explanatory diagram showing background image corresponding to the scanned image in FIG. 3;

FIG. 11(B) is an explanatory diagram showing three text images represented by text binary data obtained by thresholding three object images in the scanned image;

FIG. 15 is an explanatory diagram showing an example of a histogram for the text object image;

FIGS. 16(A)-(C) are explanatory diagrams illustrating a method of selecting a representative component;

DETAILED DESCRIPTION

A. First Embodiment

A-1. Structure of an Image Processor

Figure 1:
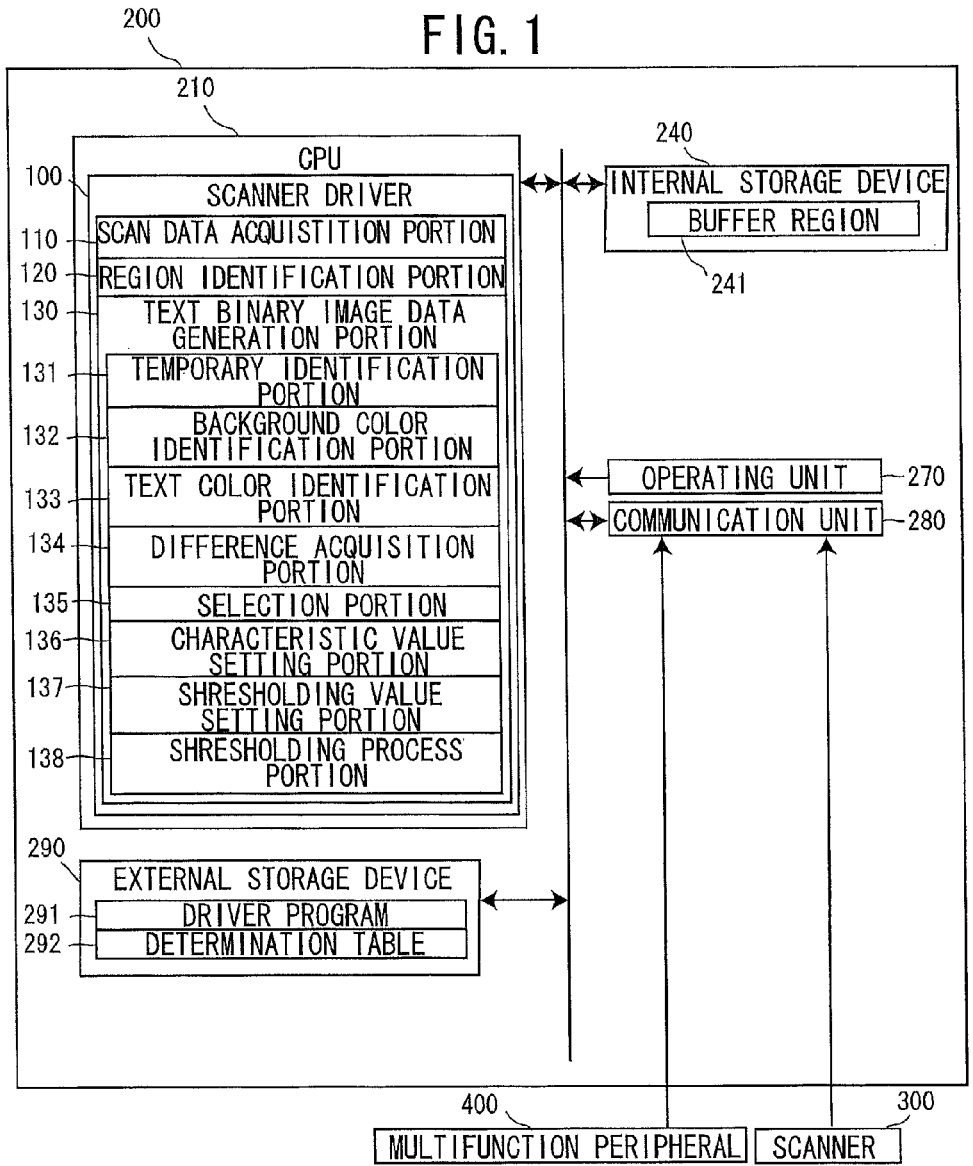
FIG. 1 is a block diagram showing a structure of a computer according to a first embodiment.

Next, a first embodiment of the present invention will be described while referring to the accompanying drawings. FIG. 1 is a block diagram showing the structure of a computer 200 serving as an embodiment of the image processing device according to the present invention.

The computer 200 is a personal computer that includes a CPU 210; an internal storage device 240 having ROM and RAM; an operating unit 270, such as a mouse and keyboard; a communication unit 280 that enables the computer 200 to communicate with external devices; and an external storage device 290, such as a hard disk drive.

The computer 200 is connected to and capable of communicating with a scanner 300 and a multifunction peripheral 400, both external devices, via the communication unit 280. The scanner 300 is an image-reading device that acquires scan data by optically reading an original. The multifunction peripheral 400 includes an image-reading unit for acquiring scan data by optically reading an original.

The internal storage device 240 is provided with a buffer region 241 for temporarily storing various intermediate data generated when the CPU 210 performs processes. The external storage device 290 stores a driver program 291, and a determination table 292 referenced in an image process described later. The driver program 291 is supplied on a CD-ROM or the like.

By executing the driver program 291, the CPU 210 functions as a scanner driver 100. The scanner driver 100 executes an image process described later on scan data to generate a high-compression PDF file. The scanner driver 100 includes a scan data acquisition portion 110, a region identification portion 120, and a text binary image generation portion 130.

As will be described later, the region identification portion 120 identifies a partial image corresponding to a region that includes text (a text object image) from scan data in order to acquire partial image data representing the text object image.

The text binary image generation portion 130 includes a temporary identification portion 131, a background color identification portion 132, a text color identification portion 133, a difference acquisition portion 134, a selection portion 135, a characteristic value setting portion 136, a threshold value setting portion 137, and a thresholding process portion 138. The text binary image generation portion 130 generates text binary data using the partial image data acquired by the region identification portion 120.

A-2. Image Process

Figure 2:
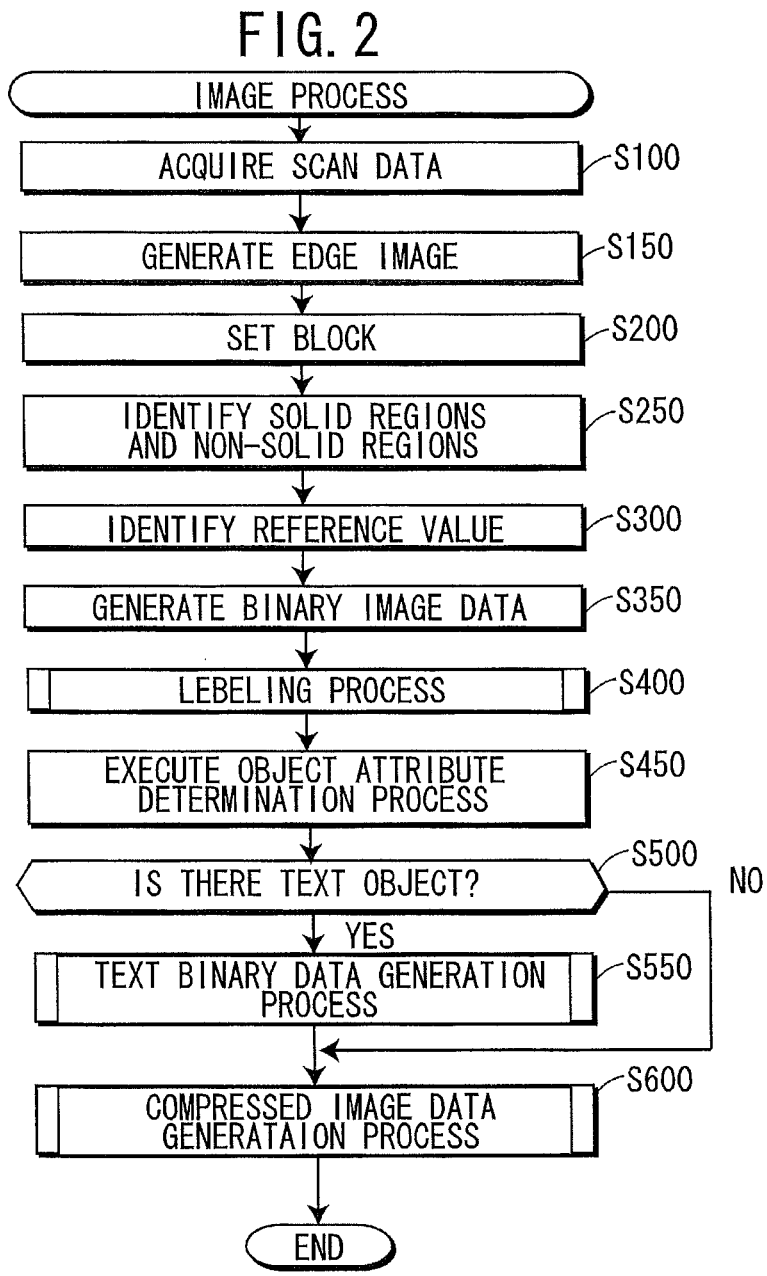
FIG. 2 is a flowchart illustrating steps in an image process executed by a scanner driver.

FIG. 2 is a flowchart illustrating steps in an image process executed by the scanner driver 100. In S100 of the image process, the scan data acquisition portion 110 of the scanner driver 100 acquires scan data to be processed. More specifically, the scan data acquisition portion 110 controls the scanner 300 or the image reading unit of the multifunction peripheral 400 to generate scan data and acquires this scan data. The scan data is bitmap data configured of RGB pixel data. RGB pixel data is image data that includes three component values for each pixel corresponding to the colors red (R), green (G), and blue (B) (component values in the embodiment are 256-level gradation values).

Figure 3:
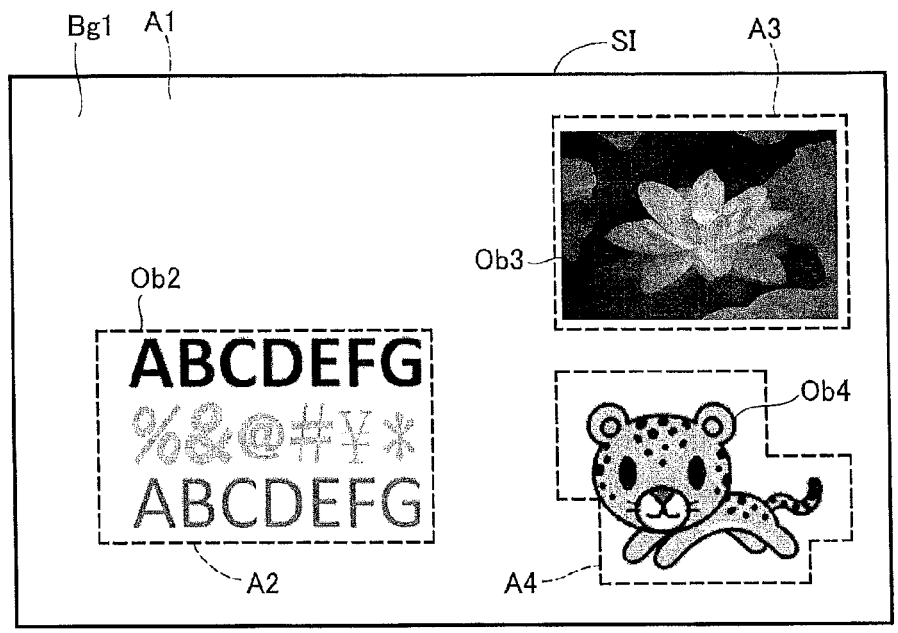
FIG. 3 is an explanatory diagram showing an example of a scanned image represented by scan data.

FIG. 3 shows an example of a scanned image SI represented by the scan data. The scanned image SI includes a background image Bg1, a text object Ob2 representing text, a photo object Ob3 representing a photograph, and a drawing object Ob4 representing a drawing. A drawing object in the embodiment includes objects representing an illustration, table, diagram, pattern, and the like. The text object Ob2 includes three lines worth of text. Each line in the three-line set of text is expressed in a different color.

In S150 the region identification portion 120 creates edge image data representing an edge image EGI based on the scan data. Edge image data is obtained by applying the Sobel filter to each component value for the plurality of RGB pixels included in the scan data. The edge image data is configured of RGB pixel data for a plurality of pixels in the scan data. The RGB pixel data expresses the edge strength of the corresponding pixel in the target image for each of the R, G, and B component values. More specifically, a prescribed component value S(x, y) for a pixel in the edge image at pixel position (x, y) is calculated according to Equation (1) below using component values P of nine pixels in the scan image SI.

$$S(x, y) = \left\| \begin{bmatrix} -1 & 0 & 1 \\ -2 & 0 & 2 \\ -1 & 0 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right\| +$$

$$\left\| \begin{bmatrix} -1 & -2 & -1 \\ 0 & 0 & 0 \\ 1 & 2 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right\|$$

Equation (1)

As shown above in Equation (1), the nine pixels are positioned on all sides of the target pixel corresponding to pixel position (x, y) in the edge image EGI. The first and second terms on the right side of Equation (1) are absolute values for the sum of values obtained by multiplying pixel values at the nine positions with corresponding coefficients. As can be seen from Equation (1), pixel data in the edge image EGI The edge image may be created using any of various edge detection filters, such as the Prewitt filter and Roberts filter, and is not limited to the Sobel filter. Edge strength represents the magnitude of change in component values between a target pixel and its peripheral pixels (where the magnitude of change is a differential value). The first term in Equation (1) is used to calculate differential in the horizontal direction, while the second term is used to calculate differential in the vertical direction.

Figure 4:
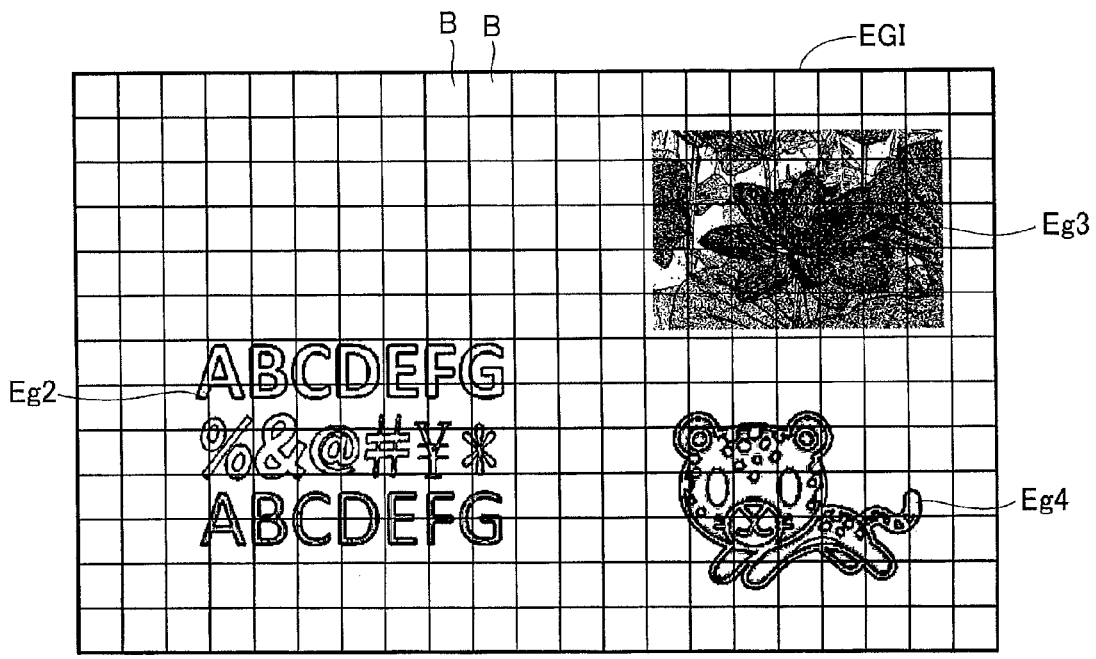
FIG. 4 is an explanatory diagram showing an example of an edge image represented by edge image data.

FIG. 4 shows an example of the edge image EGI represented by edge image data. For convenience sake, pixels in FIG. 4 having low edge strength are depicted in white, and pixels having high edge strength are depicted in black. The edge image EGI in this example includes edges Eg2-Eg4 for the corresponding objects Ob2-Ob4 in the scanned image SI.

In S200 of FIG. 2, the region identification portion 120 configures a plurality of blocks B (see FIG. 4) for the edge image EGI. The blocks B are arranged as a grid in relation to the edge image EGI. A single block B is equivalent to the size of N×N pixels (where N is a prescribed natural number), for example. N is set to a value between 10 and 50. Since the edge image EGI and the scanned image SI are identical in size (have the same number of pixels, both vertically and horizontally), it can also be said that the blocks B are configured for the scanned image SI.

In S250 the region identification portion 120 identifies solid regions and non-solid regions in units of blocks. Specifically, the region identification portion 120 calculates average edge strengths ERave, EGave, and EBave for each block B in the scanned image SI. The average edge strengths ERave, EGave, and EBave are average values of the corresponding component values R, G, and B averaged for all pixels in the block B of the edge image EGI. The region identification portion 120 compares the average edge strengths of the block B to prescribed reference values to classify the block B as either a solid block or a non-solid block. A solid block has smaller average edge strengths than the corresponding reference values, while a non-solid block has average edge strengths greater than or equal to the reference values. For example, the region identification portion 120 compares the average edge strengths ERave, EGave, and EBave to reference values ETr, ETg, and ETb set for corresponding color components. If ERave<ETr, EGave<ETg, and EBave<ETb, the region identification portion 120 classifies the target block B as a solid block. Conversely, if even one of the expressions ERave≥ETr, EGave≥ETg, and EBave≥ETb is satisfied, then the region identification portion 120 classifies the target block B as a non-solid block.

Next, the region identification portion 120 identifies non-solid regions configured of one or more non-solid blocks, and solid regions configured of one or more solid blocks. That is, the region identification portion 120 consolidates contiguous non-solid blocks into a single region identified as a non-solid region. Additionally, the region identification portion 120 identifies a single non-solid block surrounded entirely by solid blocks as a single non-solid region. Similarly, the region identification portion 120 consolidates contiguous solid blocks into a single region identified as a solid region. The region identification portion 120 also identifies a single solid block surrounded entirely by non-solid blocks as a single solid region.

The scanned image SI of FIG. 3 has regions A1, A2, A3, and A4. As a result of the process in S250, the region identification portion 120 identifies blocks B within the regions A2, A3, and A4 as non-solid blocks and, hence identifies the regions A2, A3, and A4 as non-solid regions. Additionally, the region identification portion 120 identifies the A1, excluding the regions A2, A3, and A4, as a solid region. From FIG. 3 it is clear that the non-solid regions A2, A3, and A4 correspond to the objects Ob2, Ob3, and Ob4, respectively. Similarly, the solid region A1 corresponds to the background image Bg1. Since contiguous non-solid blocks are identified collectively as a single non-solid region, as described above, non-solid regions are normally surrounded by solid regions.

In S300 the region identification portion 120 identifies a reference value for each color component in the scanned image SI needed to convert non-solid regions to binary values by using each of the RGB color components of pixels in the solid regions surrounding the non-solid region. Since each of the non-solid regions A2-A4 are surrounded by a single solid region A1 in the example of FIG. 3, component values of pixels in the solid region A1 are used to identify reference values for thresholding the non-solid regions A2-A4. More specifically, the region identification portion 120 calculates the average value of each component in the solid region A1 (background color average values BCR, BCG, and BCB) as the thresholding reference values. That is, the region identification portion 120 calculates the average value of each color component (average component value) for all pixels constituting the solid region A1. Here, the mode, median, or other value related to each component may be employed as the thresholding reference value instead of the average value. The thresholding reference values may also be identified from pixel data in a portion of the solid region that is positioned near the non-solid regions.

In S350 the region identification portion 120 generates binary image data for each non-solid region based on the threshold reference values BCR, BCG, and BCB. That is, the region identification portion 120 converts the value of each pixel constituting a non-solid region of the scanned image SI into binary values "0" and "1" and sorts the pixels constituting the non-solid region into object pixels corresponding to "1" and non-object pixels corresponding to "0". The region identification portion 120 sets the pixel value for binary image data corresponding to a pixel i to "0" when the component values Ri, Gi, and Bi of the pixel i constituting a non-solid region satisfy all of Equations (2)-(4) below and sets the pixel value to "1" when even one of the Equations (2)-(4) is not satisfied.

$$BCR - \Delta V < Ri < BCR + \Delta V \quad \text{Equation (2)}$$

$$BCG - \Delta V < Gi < BCG + \Delta V \quad \text{Equation (3)}$$

$$BCB - \Delta V < Bi < BCB + \Delta V \quad \text{Equation (4)}$$

Pixels in text binary data having a value of "1" are text pixels constituting text, while pixels having a value of "0" are non-text pixels that do not constitute text. As is clear from Equations (2)-(4), a pixel i is classified as a text pixel when the color of the pixel i is substantially the same as the color of the solid region surrounding the pixel i (when the difference in color values is less than ΔV). The pixel i is classified as a non-text pixel when the color of the pixel i differs from the color of the solid region around the pixel i (when the difference in color values is greater than or equal to ΔV).

Figure 5:
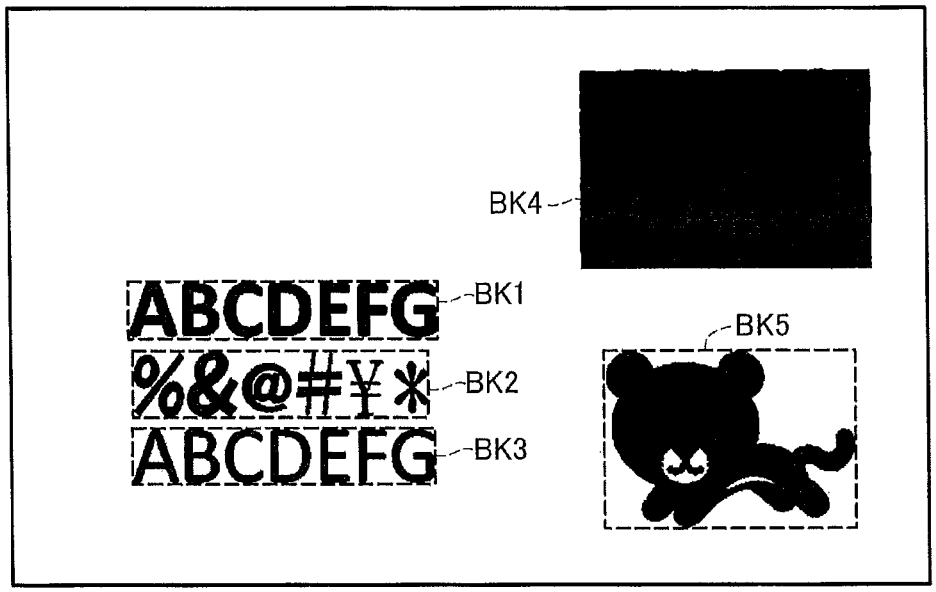
FIG. 5 is an explanatory diagram showing a sample of binary image data corresponding to the scanned image in FIG. 3.

FIG. 5 shows a sample of binary image data corresponding to the scanned image SI in FIG. 3. Dark portions in FIG. 5 represent images configured of object pixels, while white portions represent images configured of non-object pixels.

Figure 6:
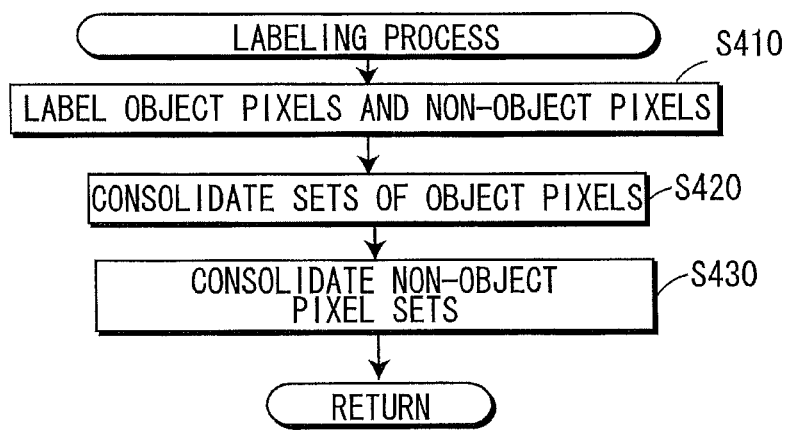
FIG. 6 is a flowchart illustrating steps in a labeling process.
Figure 7:
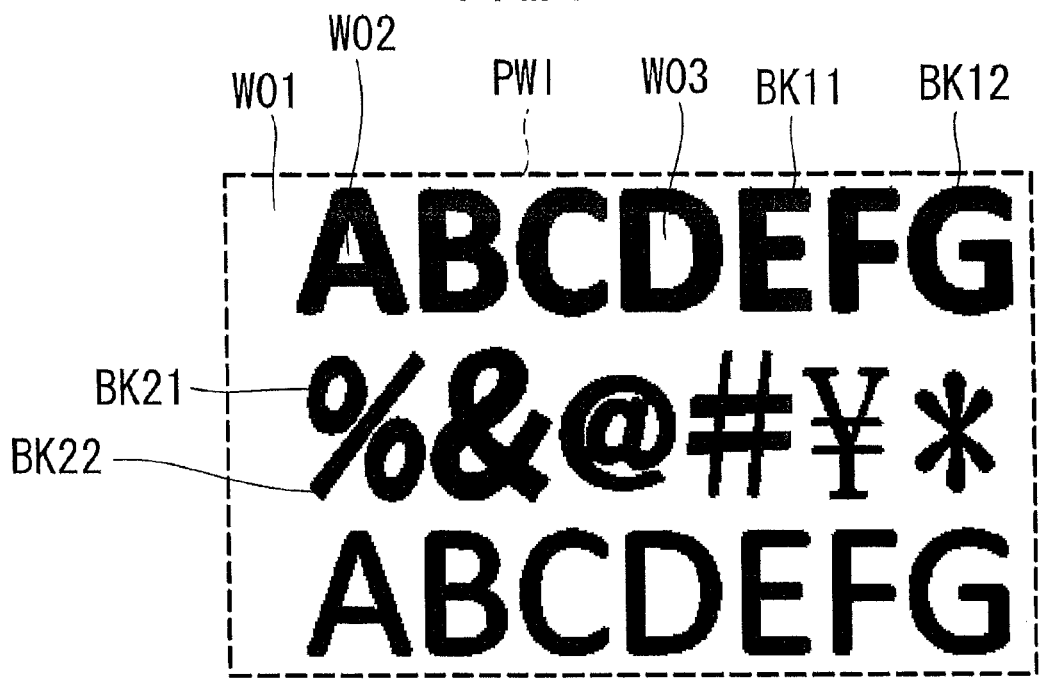
FIG. 7 is an explanatory diagram illustrating the labeling process.

In S400 of FIG. 2, the region identification portion 120 executes a labeling process. FIG. 6 is a flowchart illustrating steps in this labeling process, and FIG. 7 is an explanatory diagram illustrating the labeling process. FIG. 7 shows a partial binary image PWI corresponding to the non-solid region A2 in FIG. 3.

In S410 of the labeling process, the region identification portion 120 labels object pixels and non-object pixels based on the binary image data (see FIG. 5). The region identification portion 120 assigns a single label (identifier) to each set of object pixels configured of contiguous object pixels. In the example of FIG. 7, a separate label is assigned to each character, such as character BK11 and character BK12. When a single character is configured of separate parts, separate labels are assigned to each part, as in the example of parts BK21 and BK22. In addition, a single label is assigned to each set of non-object pixels configured of contiguous non-object pixels. In the example of FIG. 7, the peripheral part corresponding to the region surrounding the text is assigned the label WO1, while small regions enclosed within individual characters are assigned separate labels, as in the regions WO2 and WO3.

In S420 the region identification portion 120 consolidates (assigns the same label to) sets of object pixels that meet a consolidating condition. The consolidating condition includes satisfying both of condition 1, which states that the distance between sets of pixels is less than a reference value, and condition 2, which states that the difference in color between sets of pixels is less than a reference value. The distance between two object pixel sets may be represented by the vertical distance and horizontal distance between minimum bounding rectangles of the object pixel sets. The color of an object pixel set may be expressed by the average value of all pixel data in the object pixel set of the scanned image SI for each color component (Rob, Gob, Bob). The color difference between any two object pixel sets is expressed by the Euclidian distance between the two colors in the RGB color space.

When suitable reference values are set for the consolidating condition, the region identification portion 120 can consolidate a plurality of object pixel sets having substantially the same color and being positioned relatively close to one another and identifies the sets as a single consolidated object pixel set. In addition, a plurality of characters having essentially different colors can be identified as separate object pixel sets, regardless of their distance from one another. As described above, the text object Ob2 in the scanned image SI (see FIG. 3) has a plurality of characters arranged in three rows, with each row having a different color. Accordingly, in the example of FIG. 7, the object pixels representing the text object Ob2 are consolidated into three consolidated object pixel sets representing the top row of characters (alphabetic characters), the middle row of characters (symbols), and the bottom row of characters (alphabetic characters).

In S430 the region identification portion 120 consolidates (assigns the same label to) a plurality of non-object pixel sets that meet a consolidating condition. Specifically, the region identification portion 120 consolidates a first non-object pixel set of a size smaller than a reference value with a second non-object pixel set that is separated from and surrounding the first non-object pixel set by object pixels. When suitable reference values are set for the consolidating condition, the region identification portion 120 can identify non-object pixel sets constituting the background of groups of characters as a single pixel set. In the example of FIG. 7, the small regions WO2 and WO3 are consolidated into a single non-object pixel set with the peripheral region WO1.

After performing the labeling process described above, the region identification portion 120 has identified object images BK1-BK5 indicated in FIG. 5 with dashed lines. Each object image is a partial image corresponding to the minimum bounding rectangle for a set of object pixels assigned the same label. In the example of FIG. 5, the region identification portion 120 has identified the five object images BK1-BK5 that correspond to the text object Ob2, photo object Ob3, and drawing object Ob4 shown in FIG. 3. Hence, by performing the labeling process on the binary image data, the region identification portion 120 identifies the five object images BK1-BK5 as partial images of the scanned image SI.

After completing the labeling process of S400, in S450 of FIG. 2 the region identification portion 120 executes an object attribute determination process to determine an attribute of each object image in the scanned image SI. The region identification portion 120 determines attributes of object pixels based on a pixel density D, distribution width W, and color number C for the object image being processed.

The pixel density D indicates the percentage of object pixels (pixels whose value is "1" in the corresponding binary image data) that occupy the object image in the scanned image SI and is expressed by the equation D=No/Na. Here, "No" indicates the number of object pixels, and "Na" indicates the total number of pixels in the object image.

Figure 8:
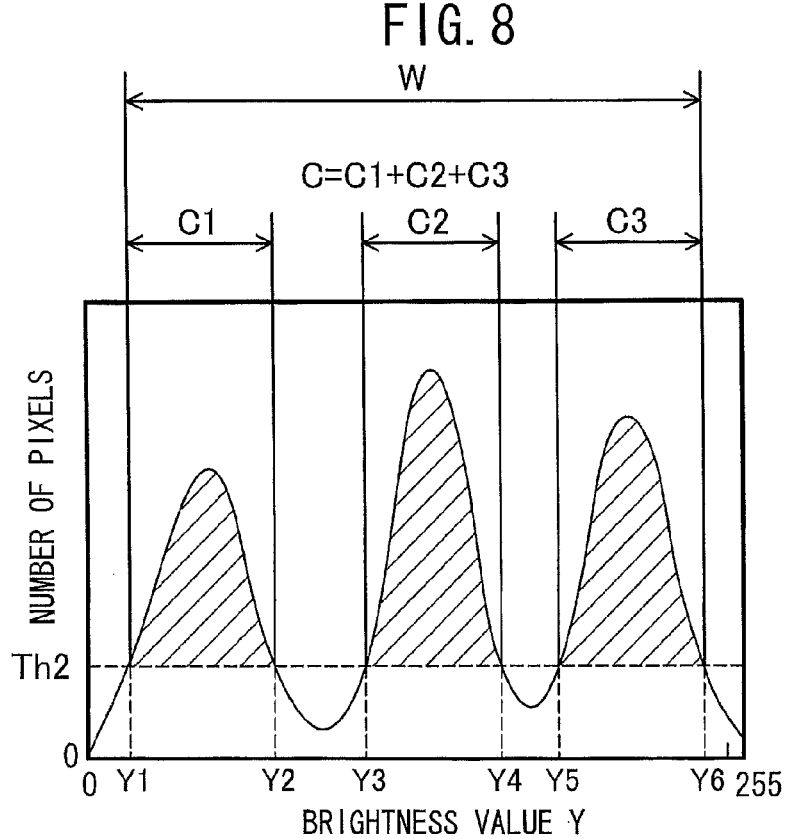
FIG. 8 is an explanatory diagram showing an example of a histogram representing a brightness distribution of an object image.

In S450 the region identification portion 120 calculates a brightness distribution for each object image in the scanned image SI. FIG. 8 shows an example of a histogram representing the brightness distribution of an object image. The histogram in FIG. 8 is produced by plotting pixel counts on the vertical axis for each of the 256 brightness values Y on the horizontal axis. The region identification portion 120 calculates the brightness value Y using RGB pixel data (R, G, and B) in an equation, such as brightness value Y=((0.298912× R)+(0.586611×G)+(0.114478×B)).

The distribution width W may be, for example, the difference between the minimum value and maximum value of valid brightness values. The valid brightness values are brightness values Y for which the pixel count exceeds a reference number Th2 (brightness values corresponding to the shaded regions in FIG. 8) from among the 256 levels of brightness values Y. In the example of FIG. 8, the distribution width W is the difference between the brightness value Y6 and the brightness value Y1.

The color number C in the embodiment is the number of valid brightness values described above. Since the colors of these pixels differ for different brightness values Y, the number of different brightness values Y (the number of types of brightness values Y) represents the number of colors (the number of types of colors). In the example of FIG. 8, the color number C is equivalent to C1+C2+C3 (C1=Y2−Y1, C2=Y4− Y3, C3=Y6−Y5).

The region identification portion 120 identifies the attribute of the object image based on the pixel density D, the distribution width W, and the color number C described above. For example, the region identification portion 120 determines whether each of the pixel density D, the distribution width W, and the color number C is greater than or equal to the corresponding reference value Dth, Wth, and Cth. Using these determination results, the region identification portion 120 references the determination table 292 to determine the attribute of the object image. In the embodiment, the region identification portion 120 determines the attribute of each object image to be one of "photo," "text," and "drawing."

As is clear from the determination table 292 in FIG. 9, the attribute of a target region is determined to be "text" in the following two cases.
(1-1) Color number C<Cth and pixel density D<Dth
(1-2) Distribution width W<Wth and color number C≥Cth and pixel density D<Dth The attribute of the target region is determined to be "drawing" in the following case.
(2-1) Color number C<Cth and pixel density D≥Dth Similarly, the attribute of the target region is determined to be "photo" in the following two cases.
(3-1) Distribution width W≥Wth and color number C≥Cth
(3-2) Distribution width W<Wth and color number C≥Cth and pixel density D≥Dth Since the attribute of a target region is determined to be "text" for case (1-1) in the embodiment, the attribute of an image region having typical text characteristics, i.e., a relatively low color number C and a relatively low pixel density D, can be accurately identified. Further, since the attribute of a target region is determined to be "drawing" for case (2-1) in the embodiment, the attribute of an image region having typical drawing characteristics, i.e., a relatively low color number C and a relatively high pixel density D, can be accurately identified. Further, since the attribute of a target region is determined to be "photo" for case (3-1) in the embodiment, the attribute of an image region having typical photo characteristics, i.e., a relatively large distribution width W and a relatively high color number C, can be accurately identified.

When a target image has a relatively small distribution width W, a relatively large color number C, and a relatively small pixel density D, the characteristics of the image match those of text, owing to the relatively small distribution width W and the relatively low pixel density D. The characteristics of the image conform to those of a photo only with respect to the relatively large color number C, and the image does not appear to have characteristics matching those of a drawing. Since the attribute of a target region is determined to be text in the case of (1-2) in the embodiment, the attribute of the target region can be accurately identified based on the high number of matching characteristics, even though the characteristics are atypical for text.

For the scanned image SI in the example of FIG. 3, the region identification portion 120 determines the attributes of the three object images BK1-BK3 to be "text" and the attributes of the object images BK4 and BK5 to be "photo" and "drawing," respectively.

In S500 the scanner driver 100 determines whether the object image was found to have the attribute "text," i.e., whether the object image is a text object image. If the object image is not a text object image (S500: NO), the scanner driver 100 advances to S600. However, if the object image is a text object image (S500: YES), in S550 the text binary image generation portion 130 of the scanner driver 100 executes a text binary data generation process in which text binary data is generated.

The text binary data generated in S550 is binary image data that suitably represents text and differs from the binary image data generated in S350 (see FIG. 5). Text binary data expresses text pixels configuring text as "1" and non-text pixels that do not configure text as "0". As will be described later, the text binary image generation portion 130 generates text binary data in this process for each object image found to have the attribute "text" (the three object images BK1-BK3 for the scanned image SI shown in FIG. 5). The scanner driver 100 advances to S600 after completing the text binary data generation process.

In S600 the scanner driver 100 executes a compressed image data generation process. FIG. 10 is a flowchart illustrating steps in the compressed image data generation process, while FIGS. 11(A) and (B) are an explanatory diagram illustrating the process.

In S610 the scanner driver 100 generates background image data using the text binary data and the scan data. That is, the scanner driver 100 replaces pixel data (color values) in the scan data that corresponds to text pixels identified by the text binary data with the value of the background color, thereby generating background image data representing a background image BGI in which the text has been removed from the scanned image SI. The background color value represents the background color in the scanned image SI around the text object. In the embodiment, the background color value is the average color value in the solid region A1 surrounding the non-solid region A2, which includes the text object. Hence, the region identification portion 120 uses the background color average values BCR, BCG, and BCB, calculated for the solid region A1 as thresholding reference values in S300 of FIG. 2, as the background color values. FIG. 11(A) shows the background image BGI corresponding to the scanned image SI in FIG. 3. The text object Ob2 (see FIG. 3) has been omitted in the background image BGI, but the photo object Ob3 and drawing object Ob4 remain.

In S620 the scanner driver 100 compresses the background image data generated in S610 to produce compressed background image data. The background image BGI is a multi-level (256-level, for example) image that may include photos and drawings, but not text. The scanner driver 100 generates the compressed background image data using JPEG (Joint Photographic Experts Group) compression, which is suitable for compressing such multi-level images. Since the background image data does not include text, there are relatively few high-frequency components. Consequently, the compression ratio for compressing background image data with JPEG compression is higher than that for compressing the original image (scan data that includes text).

In S630 the scanner driver 100 compresses the text binary data to produce compressed text binary data. FIG. 11(B) shows three text images TL1-TL3 represented by text binary data obtained by thresholding the three object images BK1-BK3 in the scanned image SI. The text images TL1-TL3 are prone to poor legibility due to pronounced jagged edges when resolution is reduced. The scanner driver 100 generates compressed text binary data using a reversible compression method called Modified Modified READ (MMR) that is capable of compressing the binary image data at a high ratio without losing resolution.

In S640 the scanner driver 100 generates high-compression PDF data from the compressed background image data, the compressed text binary data, text color values expressing the color of text represented by the compressed text binary data (RGB values expressing the text color), and coordinate data. The text color values are identified in the text binary data generation process described later (S550 of FIG. 2). The coordinate data represents the relative positions of the text images TL1-TL3 represented by the compressed text binary data in the background image BGI represented by the compressed background image data using coordinates of the background image BGI. PDF standards have been established for storing image data in a plurality of formats in a single file and for superimposing this image data in order to reproduce a single image. The scanner driver 100 generates high-compression PDF data representing the scanned image SI according to the PDF standards by storing the compressed background image data and compressed text binary data in a single file and by storing the text color values and coordinate data in this file in association with the compressed text binary data. In this way, the scanner driver 100 can save scanned images SI that contain text in a format that requires a relatively small amount of data yet produces sharp text. After generating high-compression PDF data, the scanner driver 100 ends the current image process.

A-3: Text Binary Data Generation Process

Figure 12:
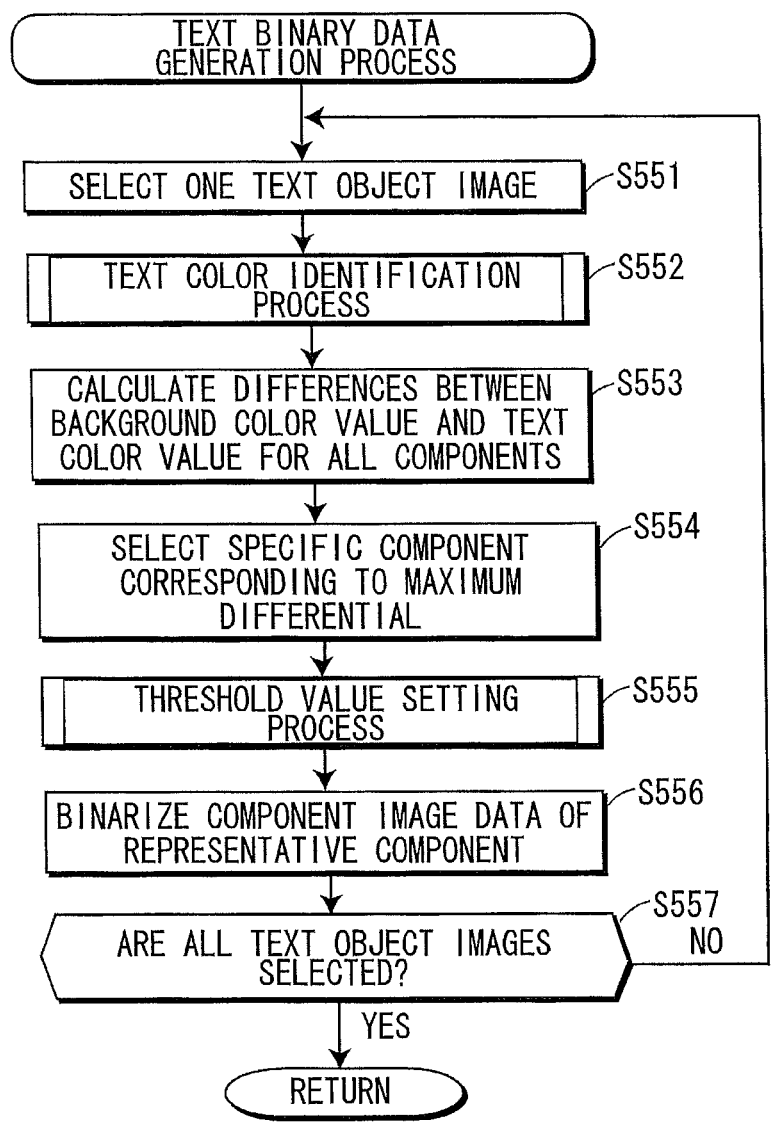
FIG. 12 is a flowchart illustrating steps in a text binary data generation process in S550 of FIG. 2.

FIG. 12 is a flowchart illustrating steps in the text binary data generation process in S550 of FIG. 2. As described above, the text binary image generation portion 130 executes the text binary data generation process to generate text binary data for each text object image. The text binary data is binary image data that suitably renders text.

Figure 13:
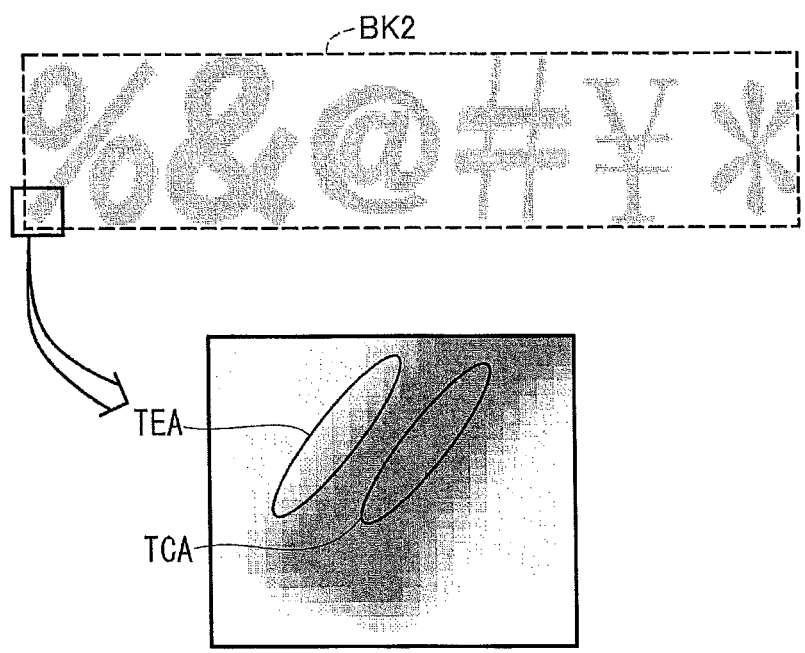
FIG. 13 is an explanatory diagram showing a text object image as an example.

In S551 of the text binary data generation process, the text binary image generation portion 130 selects one text object image to be processed. FIG. 13 shows the text object image BK2 as an example. The following description will assume that the text binary image generation portion 130 has selected the text object image BK2 to be processed.

In S552 the temporary identification portion 131, the background color identification portion 132, and the text color identification portion 133 of the text binary image generation portion 130 execute a text color identification process to identify the text color value representing the color of characters in the text object image BK2.

Figure 14:
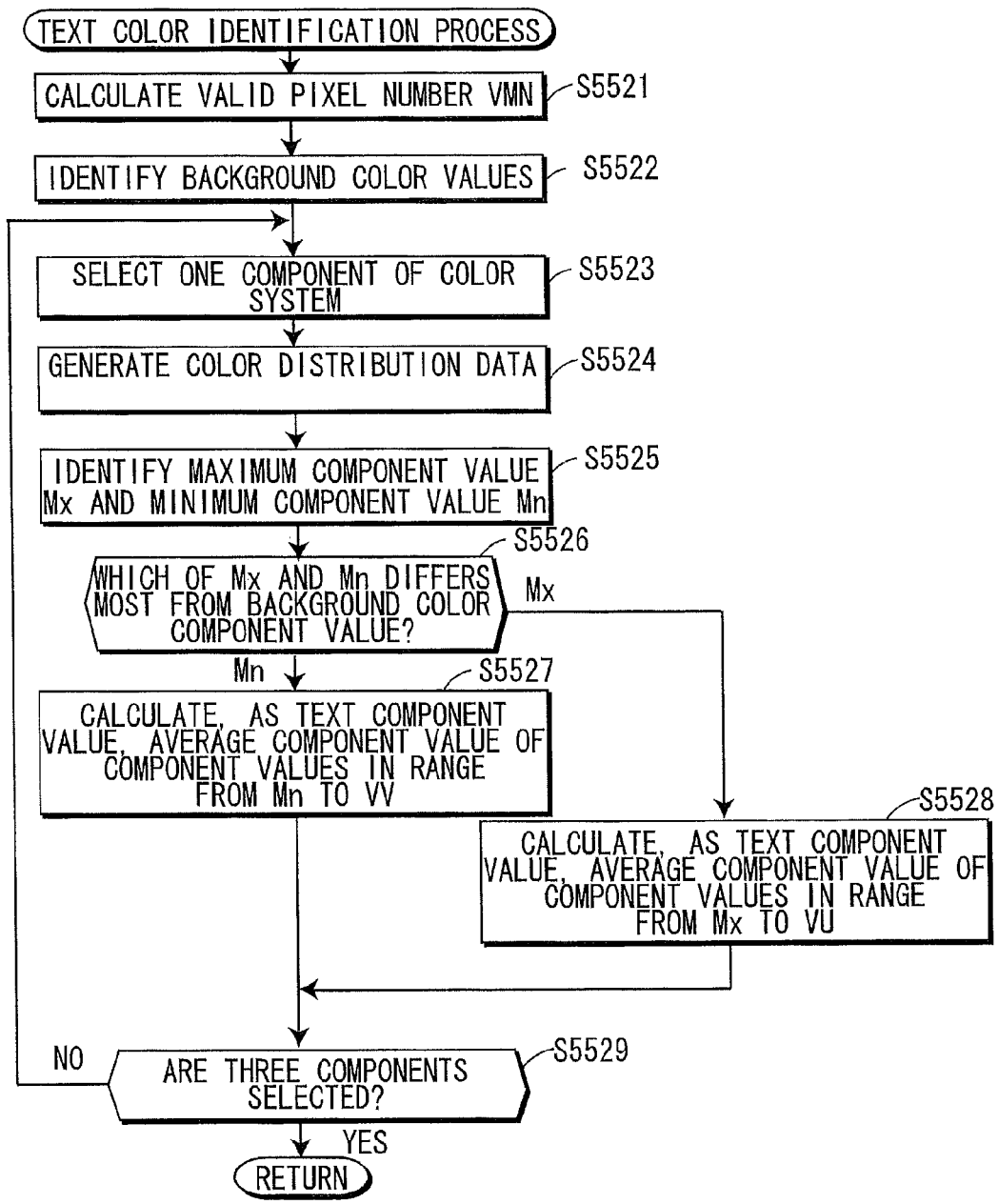
FIG. 14 is a flowchart illustrating steps in a text color identification process.

FIG. 14 is a flowchart illustrating steps in the text color identification process. In S5521 at the beginning of this process, the temporary identification portion 131 temporarily identifies text pixels in the text object image BK2 to calculate a valid pixel number VMN. More specifically, the temporary identification portion 131 temporarily identifies object pixels (pixels having the value "1") in binary image data for the text object image BK2 that was generated in S350 of FIG. 2 as text pixels. The temporary identification portion 131 counts the total number of text pixels temporarily identified and calculates the valid pixel number VMN by multiplying this total by a prescribed coefficient (ratio). In the embodiment, the coefficient is set to 0.2.

In S5522 the background color identification portion 132 identifies background color values representing the background color of the text object image BK2. In the embodiment, the background color identification portion 132 identifies the background color values using color data (pixel data) for the solid region A1 in the scanned image SI surrounding the non-solid region A2 that includes the text object image BK2, because the background in the text object image BK2 is continuous with the solid region A1 and, hence, likely has a color similar to that of the solid region A1. More specifically, the background color identification portion 132 identifies the background color values as the background color average values BCR, BCG, and BCB in the solid region A1. These background color values are identical to the color values calculated in S300 as the thresholding reference values.

In S5523 the text color identification portion 133 selects one of the components of the color system in which the text object image BK2 is expressed (one of the RGB components in the embodiment).

In S5524 the text color identification portion 133 generates color distribution data (a histogram) from the image data corresponding to the selected component (partial image data acquired from the scan data). Pixel data for each pixel in image data representing the text object image BK2 includes three component values for the RGB colors. In other words, image data representing the text object image BK2 can include image data for three components. The component image data for each component is image data configured of one of the three component values. The color distribution data is generated from the component image data corresponding to the selected component for the text pixels described above.

FIG. 15 shows an example of a histogram for the text object image BK2, and specifically for the R component of the text object image BK2 (the R component image data). A segment HGR1 of the plotted line depicted as a solid line in FIG. 15 is a histogram of the set of text pixels in the text object image BK2 that were temporarily identified in S5522. The segment HGR2 depicted as a dashed line is a histogram of pixels other than the text pixel set (i.e., pixels representing the background areas).

In S5525 the text color identification portion 133 uses the histogram generated in S5524 to identify a maximum component value Mx and a minimum component value Mn of the text pixel set temporarily identified in S5522. In S5526 the text color identification portion 133 compares a difference DW1 between the gradation value of the component selected from the background color values (hereinafter "background color component value") and the maximum component value Mx and a difference DW2 between the background color component value and the minimum component value Mn. The text color identification portion 133 determines which of the differences DW1 and DW2 is greater, i.e., which of the maximum component value Mx and minimum component value Mn differs most from the background color component value. FIG. 15 shows an example in which the difference DW2 between the minimum component value Mn and background color component value (BCR) is greater than the difference DW1 between the maximum component value Mx and the background color component value (BCR). Here, the background color average value BCR is used as the background color component value. This case may arise when the background color approaches white and the text color approaches black, for example. There are other cases in which the difference DW1 between the maximum component value Mx and the background color component value (BCR) may be greater than the difference DW2 between the minimum component value Mn and the background color component value BCR, such as when the background color approaches black and the text color approaches white.

If the minimum component value Mn differs most from the background color component value (S5526: Mn), in S5527 the text color identification portion 133 calculates, as the text color component value, the average component value of text pixels having component values in the range from the minimum component value Mn to an uppermost valid component value VV. The uppermost valid component value VV is set so that the number of text pixels having component values in the range from the minimum component value Mn to the uppermost valid component value VV is equivalent to the valid pixel number VMN. Specifically, the text color identification portion 133 sequentially selects one component value at a time from the histogram, beginning in order from the minimum component value Mn, and counts the number of text pixels having the selected component value. The text color identification portion 133 repeats this process of sequentially selecting a component value and counting the number of text pixels with that component value until the total count of the selected component values exceeds the valid pixel number VMN. The text color identification portion 133 ends the process of selecting component values and counting text pixels once this total count exceeds the valid pixel number VMN, and computes the average component value for the valid pixel number VMN of text pixels counted up to that point. The example in FIG. 15 shows a shaded area VA of the histogram that includes a number of pixels equivalent to the valid pixel number VMN. In this example, the text color identification portion 133 calculates an average component value TCR for the R components of the pixels included in the shaded area VA as the text color component value.

When the maximum component value Mx differs most from the background color component value (S5526: Mx), in S5528 the text color identification portion 133 calculates the average component value of text pixels having component values within a range from the maximum component value Mx to a lowermost valid component value VU as the text color component value. The lowermost valid component value VU is set so that the number of text pixels having component values within a range from the maximum component value Mx to the lowermost valid component value VU is equivalent to the valid pixel number VMN. Specifically, the text color identification portion 133 calculates the text color component value by sequentially selecting one component value at a time, beginning from the maximum component value Mx, and executing a process similar to S5527 described above. The average component value TCR for the R component is indicated in FIG. 15 as the text color component value.

In S5529 the text color identification portion 133 determines whether all three components in the color system have been selected. If all three components have been selected (S5529: YES), the text color identification portion 133 ends the text color identification process. However, if there remain components that have not been selected (S5529: NO), the text color identification portion 133 returns to S5523, selects an unprocessed component, and repeats the process in S5524-S5528 described above.

When the text color identification process is completed, text color component values have been calculated for all components in the color system. As a result, the text color identification portion 133 has identified a text color value comprising this set of text color component values. In the embodiment, the text color identification portion 133 identifies a text color value comprising text color component values TCR, TCG and TCB expressed in the RGB color system. Here, the text object image BK2 is one part of the scanned image SI represented by scan data generated by the scanner 300 or the image-reading unit of the multifunction peripheral 400. As a result of this process, as shown in FIG. 13, an intermediate color region TEA having an intermediate color between the background color and text color can be expressed near the edge of the text object image BK2 between the background and the text. In the text color identification process described above, the text color identification portion 133 calculates a text color using a prescribed ratio of text pixels ranging sequentially from the color farthest from the background color (the color having a component value that differs most from that of the background color) to the back ground color in the histogram. In relation to the text object image BK2, it can be said that the text color identification portion 133 calculates the text color using text pixels in a region TCA positioned farthest from edge between the text and the background (hereinafter referred to as a text core area TCA.

In S553 of FIG. 12, the difference acquisition portion 134 calculates the differences between the background color value (BCR, BCG, BCB) and the text color value for all components in the color system (TCR, TCG, TCB). As a result of this process, the difference acquisition portion 134 acquires differentials DFR, DFG, and DFB for the three components R, G, and B. The differential DFR for the R component is the absolute value of (BCR−TCR). Similarly, the differential DFG for the G component is the absolute value of (BCG−TCG) and the differential DFB of the B component is the absolute value of (BCB−TCB).

In S554 the selection portion 135 selects a specific component corresponding to the maximum differential among the three differentials DFR, DFG, and DFB to serve as a representative component. FIGS. 16(A)-(C) illustrate the method of selecting this representative component. FIG. 16(A)-(C) show histograms HGR, HGG, and HGB that respectively indicate the R component image data, G component image data, and B component image data included in a single text object image. In this example, the differentials of the three components in the RGB color system all differ from one another. Specifically, the relationship of the three component differentials is (differential DFR of R component)>(differential DFB of B component)>(differential DFG of G component). Accordingly, the selection portion 135 selects the R component as the representative component in this example. That is, the selection portion 135 selects the R component image data as the component image data to be used in steps S555 and S556 described later.

Figure 17:
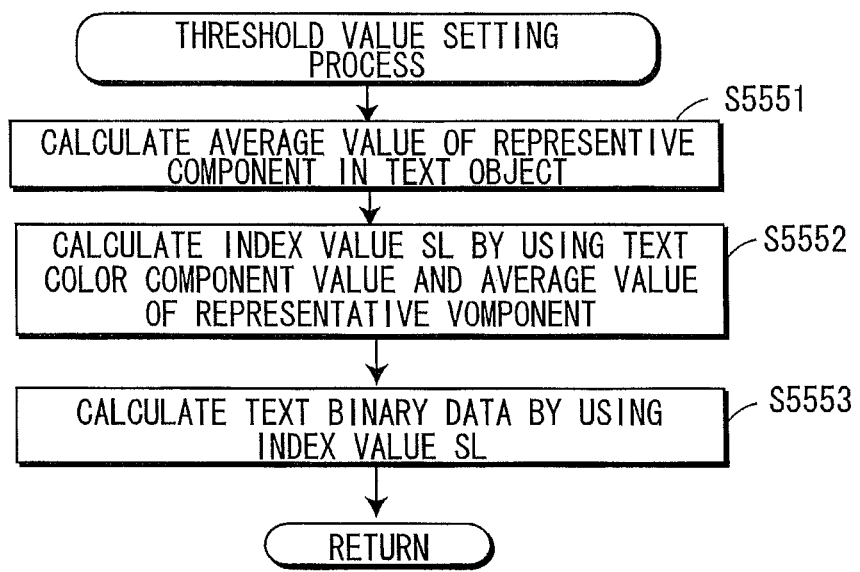
FIG. 17 is a flowchart illustrating steps in a threshold value setting process.

In S555 of FIG. 12, the characteristic value setting portion 136 and the threshold value setting portion 137 execute a threshold value setting process. FIG. 17 is a flowchart illustrating steps in the threshold value setting process. In S5551 the characteristic value setting portion 136 acquires the average value of the representative component in the text object image currently being processed. The average value of the representative component is found by averaging the representative component for all text pixels included in the text object image. For example, an average value AVR of the R component shown in FIG. 15 is the average value of the R component for the set of pixels constituting the text object image that have an R component value in the range from the minimum component value Mn to the maximum component value Mx.

In S5552 the characteristic value setting portion 136 acquires a characteristic value TL related to the sharpness of the text (hereinafter referred to as "text sharpness TL") using the gradation value of the representative component identified above among the text color value (hereinafter referred to as the "text color component value of the representative component") and the average value of the representative component. That is, the characteristic value setting portion 136 computes the absolute value SL of (text color component value of the representative component)−(average component value of the representative component). The text sharpness TL is the inverse of the absolute value SL (TL=1/SL). Here, text has less blurriness when the text sharpness TL is higher and more blurriness when the text sharpness TL is lower. Hence, the absolute value SL may be called an index value representing the indistinctness or blurriness of text. In other words, a relatively high text sharpness TL (relatively large value) denotes a relatively low degree of blurriness, while a relatively low text sharpness TL (relatively small value) denotes a relatively high degree of blurriness. FIG. 15 shows the absolute value SL of the R component (average component value AVR−text color component value TCR), which is the representative component.

In S5553 the threshold value setting portion 137 uses the text sharpness TL to set a threshold value TH used to generate text binary data in the thresholding process. More specifically, the threshold value setting portion 137 first calculates a parameter PR using the following equation.

$$PR = 2 \times (1/TL) - 20 \qquad \text{Equation (5)}$$

Next, the threshold value setting portion 137 calculates the threshold value TH according to the following method using the parameter PR calculated above. That is, the threshold value setting portion 137 sets the threshold value TH to a value obtained by shifting the text color component value of the representative component by the parameter PR toward the background color component value of the representative component. In other words, if (text color component value of the representative component)≤(background color component value of the representative component), e.g., when the background is brighter than the text, the threshold value setting portion 137 sets the threshold value TH to (text color component value of the representative component)+(parameter PR). When the (text color component value of the representative component)>(background color component value of the representative component), e.g., when the text is brighter than the background, the threshold value setting portion 137 sets the threshold value TH to (text color component value of the representative component)−(parameter PR). In this way, the threshold value setting portion 137 can set a suitable threshold value TH between the text color component value and the background color component value of the representative component. FIG. 15 shows the threshold value THR for the R component, which is the representative component in this example. Since the text color component value TCR ≤ background color value BCR in the example of FIG. 15, the threshold value THR is set to (text color component value TCR+parameter PR).

In S556 of FIG. 12 the thresholding process portion 138 executes a thresholding process on the component image data of the representative component using the threshold value TH. Through this process, the thresholding process portion 138 generates text binary data representing text in the text object image BK2. An example in which the representative component is the R component will be described here. When R component value≤background color value BCR, the thresholding process portion 138 generates the text binary data by setting all R component values in the R component image data that are less than or equal to the threshold value THR to "1" and all R component values greater than the threshold value THR to "0". However, if background color value BCR<R component value, the thresholding process portion 138 generates the text binary data by setting all R component values in the R component image data that are greater than or equal to the threshold value THR to "1" and all R component values less than the threshold value THR to "0".

In S557 the text binary image generation portion 130 determines whether all text object images have been subjected to the above process. If all text object images have been processed (S557: YES), the text binary image generation portion 130 ends the text binary data generation process. However, if there remain unprocessed text object images (S557: NO), the text binary image generation portion 130 returns to S551, selects an unprocessed text object image, and repeats the process in steps S552-S556 described above.

According to the text binary data generation process of the embodiment described above, the text binary image generation portion 130 sets the threshold value TH using the background color value of the text object image (the background color component value BCR, for example), the text color value (the text color component value TCR, for example), and the text sharpness TL. In this way, the text binary image generation portion 130 can generate text binary data that renders text appropriately based on the sharpness of the text.

As in the example of the text object image BK2 described with reference to FIG. 13, a text core area TCA and an intermediate color region TEA positioned on the periphery of the text core area TCA (in a region near the edge between the text and background) appears in text of the scanned image. Thus, it is possible to determine that the text sharpness TL of text is lower when the intermediate color region TEA of the text image is larger (wider), indicating that the text is more indistinct (the outline of the characters is blurry). Similarly, it is possible to determine that the text sharpness TL is higher when the intermediate color region TEA of the text image is smaller (thinner), indicating that the text is less indistinct (the outline of the characters is sharp). If a suitable threshold value TH cannot be set for text binary data in such text object images, textual elements represented by the text binary image (primarily fine lines) might be formed at an inappropriate width.

Figure 18A:
FIG. 18(A) is an explanatory diagram showing a sample text image rendered by the text binary data generated in the text binary data generation process according to the embodiment shown in FIG. 12.
Figure 18B:
FIG. 18(B) is an explanatory diagram showing a first comparative example of a text image rendered by binary data generated when the threshold value is set too close to a background color value.
Figure 18C:
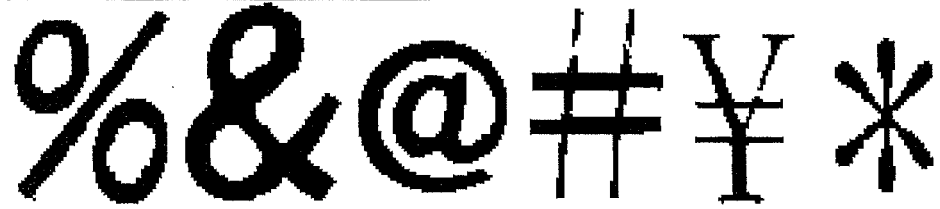
FIG. 18(C) is an explanatory diagram showing a second comparative example of a text image rendered by binary data generated when the threshold value is set too far from the background color value.

FIGS. 18(A)-18(C) are explanatory diagrams illustrating the effects of the embodiment. FIG. 18(A) shows a sample text image rendered by the text binary data generated in the text binary data generation process according to the embodiment shown in FIG. 12. FIG. 18(B) is a first comparative example of a text image rendered by binary data generated when the threshold value TH is set too close to the background color value (too far from the text color value). Elements of the characters in the text image of the first comparative example are excessively thick, making the characters less attractive and more indistinct than the text image of the embodiment (FIG. 18(A)). For example, elements in the third character from the left (@) run together when they should be apart.

FIG. 18(C) is a second comparative example of a text image rendered by binary data generated when the threshold value TH is set too far from the background color value (too close to the text color value). Elements of the characters in the text image of the second comparative example are excessively thin, making the characters less attractive and more indistinct than the text image of the embodiment (FIG. 18(A)). For example, the second character from the right (¥) and the third character from the right (#) have breaks in some of the thin lines.

In contrast, the scanner driver 100 according to the embodiment can set a suitable threshold value TH for thresholding using the text sharpness TL. Thus, the scanner driver 100 can avoid a drop in the appearance or distinctness of text represented by text binary data, as shown in FIG. 18(A).

Figure 19A:
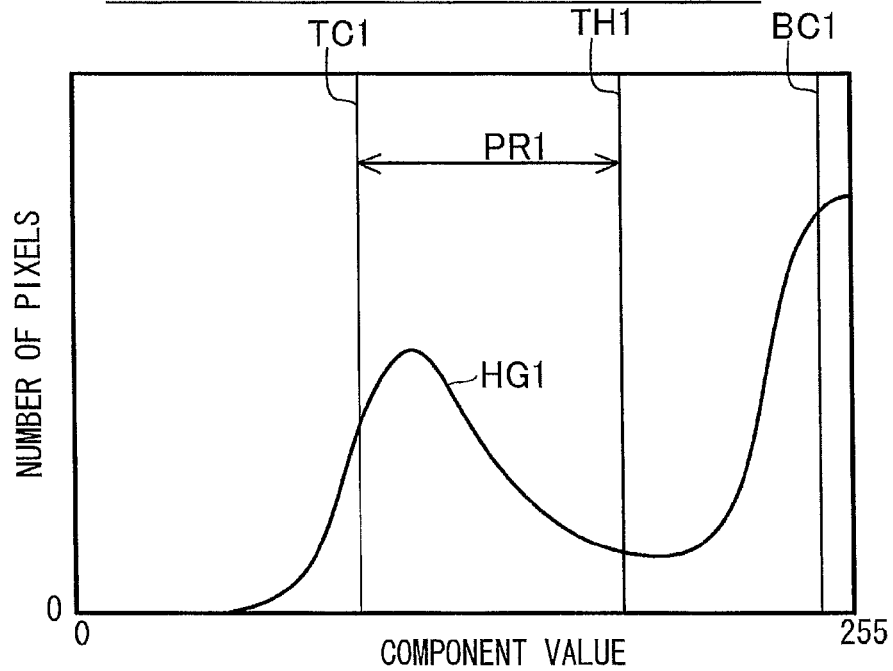
FIG. 19(A) is a histogram of component values for a prescribed component when a text sharpness is relatively low.
Figure 19B:
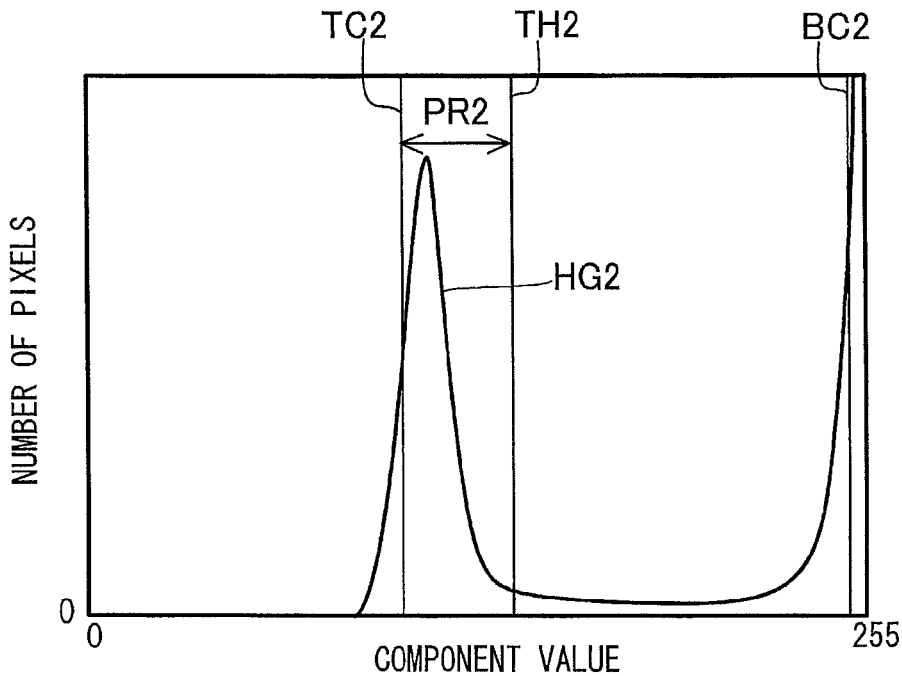
FIG. 19(B) is a histogram of component values for a prescribed component when the text sharpness is relatively high.

FIGS. 19(A) and 19(b) illustrate the relationship between the text sharpness TL of text and the threshold value TH set in the embodiment. FIG. 19(A) shows a histogram HG1 of component values for a prescribed component when the text sharpness TL is relatively low. FIG. 19(B) shows a histogram HG2 of component values for a prescribed component when the text sharpness TL is relatively high. As can be seen from the graphs, the breadth of the histogram HG1 in FIG. 19(A) (indicated in dispersion, for example) is relatively large when the text sharpness TL is relatively low. In other words, the difference between the text color value (the color of the text core area TCA in FIG. 13) and the average color value for the entire text is great, and the absolute value SL is large. On the other hand, the breadth of the histogram HG2 is relatively small when the text sharpness TL is relatively high. In other words, the difference between the text color value and the average color value is small, and the absolute value SL is small. In this way, the characteristic value setting portion 136 can set a suitable text sharpness TL based on the difference between the text color value and the average color value of the text pixel set temporarily identified from the binary image data generated in S350 of FIG. 2.

As described above, the threshold value setting portion 137 of the embodiment calculates the threshold value TH by shifting the text color component value of the representative component a parameter PR in the direction toward the background color component value of the representative component. The parameter PR is calculated to correspond to the amount that the threshold value TH deviates from the text color component value using the equation $PR=2\times(1/TL)-20$. Hence, when the text sharpness TL is relatively high (when the blurriness of the text is relatively low), the threshold value setting portion 137 sets the threshold value TH such that the difference between the text color value and the threshold value TH is relatively small. When the text sharpness TL is relatively low (when the blurriness of the text is relatively high), the threshold value setting portion 137 sets the threshold value TH such that the difference between the text color value and the threshold value TH is relatively large. Therefore, the text binary data generation process of the embodiment can set a suitable threshold value TH for both cases in which the text sharpness TL is relatively low (in which the text blurriness is relatively high) and cases in which the text sharpness TL is relatively high (in which the text blurriness is relatively low), thereby producing text binary data that renders text appropriately.

The text binary data generation process of the embodiment also generates binary image data using component image data for one specific component in the color system used by the scan data, e.g., one of the RGB components in the RGB color space. This specific component has the maximum component differential between its text color value and background color value among the three component differentials DFR, DFG, and DFB. If the component differential is small, there is a possibility that a slight difference in the position of the threshold value TH could cause a major change in the thresholding results. Consequently, it is sometimes difficult to set a suitable threshold value TH for component image data having a small component differential.

Suppose, for example, that the threshold value TH were set slightly closer to the text color value than the optimum threshold value TH for component image data having a relatively small component differential. A text image rendered by text binary data that was generated using this component image data and this threshold value TH would very likely have elements that are excessively thin, as in the second comparative example shown in FIG. 18(C). Conversely, suppose that the threshold value TH were set slightly closer to the background color value than the optimum threshold value TH for component image data having a relatively small component differential. A text image rendered by text binary data that was generated using this component image data and this threshold value TH would very likely have elements that are excessively thick, as in the first comparative example shown in FIG. 18(B). When the component image data has a relatively high component differential, on the other hand, the text image rendered by text binary data that was generated using this component image data, even when using a threshold value TH that is offset from the optimum threshold value TH, is unlikely to differ greatly from a text image produced when using the optimum threshold value TH. Hence, the range of allowable threshold values TH is increased when using component image having a relatively large component differential, making it possible to produce stable text binary data that satisfactorily renders the text image. The scanner driver 100 according to the embodiment can generate text binary data that suitably renders text using component image data having the largest component differential.

Further, consider an extreme example when the background color is white, i.e, when the RGB values for 256 levels are (255, 255, 255), and the text color is yellow, i.e, when the RGB values are (255, 255, 0). This example illustrates how there can be almost no component differential in the first component image data (the R component image data or G component image data, for example) while there is a large component differential in the second component image data (the B component image data, for example) for some combinations of background color values and text color values. In such cases, it is very difficult to produce text binary data using the first component image data. However, suitable text binary image data can easily be produced using the second component image data, which has a large component differential. Hence, the scanner driver 100 according to the embodiment can easily produce suitable text binary image data regardless of the combination of background color values and text color values.

Further, when the background color is white and the text color is yellow, the difference between the brightness value Y of the background color and the brightness value Y of the text color is not great. As is clear from the formula for calculating the brightness value Y, $Y=((0.298912 \times R)+(0.586611 \times G)+(0.114478 \times B))$, the contribution of the B component to the difference in the brightness value Y between the yellow and white colors is much smaller than the contribution of the R and G components. In other words, there is a possibility that suitable text binary data cannot be generated for some combinations of background color values and text color values, even when using brightness image data. However, the scanner driver 100 according to the embodiment can easily produce suitable text binary image data using the component image data having the largest component differential.

In the embodiment, the thresholding value setting portion 137 determines the threshold value TH by using the specific component of the three color components and the text color value of the specific component. Here, the specific component is a component having the maximum differential. Specifically, the thresholding value setting portion 137 compares the background color value of the specific component and the text color value of the specific component, and calculate the threshold value TH by shifting the text color value of the specific component by the parameter PR toward the background color value of the specific component. If the differential between the background color value of the specific component and the text color value of the specific component (the component of the difference corresponding to the specific component) is small, it will be sometimes difficult to calculate properly the threshold value TH unless the values (the background color value of the specific component, the text color value of the specific component, and the parameter PR) are properly determined with high accuracy. However, in the embodiment, the threshold value TH can be easily calculated by using the background color value of the specific component corresponding to the maximum differential and the text color value of the specific component.

The text color identification portion 133 according to the embodiment identifies the text color value using the background color value. Further, the text color identification portion 133 identifies the text color value using some of the pixels from the temporarily identified text pixel set. Thus, the text color identification portion 133 can suitably identify a text color value. Specifically, the text color identification portion 133 of the embodiment identifies the maximum component value Mx and the minimum component value Mn in the temporarily identified pixel set from a histogram of the object image. The text color identification portion 133 identifies the text color value using a pixel set (including pixels of the valid pixel number VMN) having component values close to the maximum component value Mx or the minimum component value Mn that differs most from the background color value. Hence, the pixel set used for identifying the text color value includes the color value (one of the maximum component value Mx and the minimum component value Mn) among the temporarily identified text pixel set having the greatest difference from the background color value. Therefore, the text color identification portion 133 can identify the text color value to be a value representing the color of the text core area TCA in the characters (see FIG. 13), which is less likely to be dependent on the text sharpness or background color value. As a result, the text color identification portion 133 can identify a suitable text color value, regardless of the text sharpness (blurriness) or the type of background color.

In the embodiment, the background color identification portion 132 identifies the background color value using pixel values in the solid region A1 of the scanned image SI that surrounds the text object image. Since the background color identification portion 132 identifies the background color value using a portion of the scan data representing the scanned image SI that differs from the portion of data representing the text object image, the background color identification portion 132 can identify the background color value appropriately based on a portion of the scanned image SI different from the text object image.

B. Variations of the Embodiments (1) In the embodiment, the parameter PR is calculated by using the index value SL, and the threshold value TH is calculated by using the parameter PR. However, the threshold value can be calculated otherwise. For example the threshold value TH can be calculated by using following Equation (6):

$$TH = \text{text color component value} \times PR2 + \text{background color component value} \times (1-PR2) \quad \text{Equation (6)}$$

Here, PR2 is a designed value set in a following range: 0<PR2<1. For example, if the text rendered by the text binary data is required to be thin, the designed value PR2 is set to be a relatively small value. On the other hand, if the text rendered by the text binary data is required to be thick, the designed value PR2 is set to be a relatively large value.

(2) In the embodiment, the text sharpness TL (equivalent to 1/SL, where SL is the absolute value of (average component value AVR−text color component value TCR)) is used as the characteristic value for text sharpness, but various other characteristic values may be used. For example, statistics correlated with the breadth of peaks in the histogram of a text object image may be used as the characteristic value, such as the inverse of dispersion or the height of the peak relative to the number of text pixels. Other possible characteristic values are characteristics of the image-reading unit (the scanner 300 or the like) used to generate the scan data, such as characteristics of the optical sensor (CCDs or the like), light sources, and other components, and particularly device characteristics related to text sharpness.

Further, the background color value of the text object image was set to the average color value of all pixels in a solid region surrounding the text object image, but the present invention is not limited to this value. For example, the background color value of the text object image may be set to the average color value in a ring-like region surrounding the text object image that has a prescribed width. The prescribed width may be equivalent to between one and a few blocks B set when identifying the regions (see FIG. 4). The background color identification portion 132 may also identify the background color value using pixels in the text object image. For example, the background color identification portion 132 may identify the background color value using all or some of the pixels in the text object image, excluding the text pixels.

The present invention may also apply to other methods of identifying text color, in addition to the method described in the embodiments. For example, the text color identification portion 133 may set the range of component values in the histogram of the text object image (for example, a range between maximum component value Mx and the minimum component value Mn) such that the number of the pixels in the range is greater than or equal to a reference value, and set the text color component value to a value in the range. This value is positioned at a prescribed position from one end of the range opposite to a side of the background color component value (a position in the first quarter of the range of component values, for example).

(3) In the embodiment described above, the difference acquisition portion 134 calculates component differentials (the difference between the text color value and the background color value for each component) using a histogram of component image data for each component in the RGB color space. Next, the difference acquisition portion 134 selects the component having the largest component differential as a representative component. However, the difference acquisition portion 134 may calculate differentials for components in other color systems, such as the three components in the YCaCb color system or the three components in the CIELAB color system. In this case, the selection portion 135 may select the component having the largest differential among the components in the color system to be used as the representative component. Thus, the components constituting the color system may all be components related to color, as in the components of the RGB color system, or may include components not related to color, as with the brightness component (Y) in the YCaCb color system.

(4) In the embodiment, the region identification portion 120 performs a thresholding process based on background color values in order to temporarily identify text pixels (S600 of FIG. 2), prior to generating the final text binary data, but other methods may be used to temporarily identify text pixels. For example, the temporary identification portion 131 may identify a partial set of the pixels constituting the text object image, excluding pixels having color values within a prescribed range that includes the background color value, as the set of pixels constituting text. Through this process, the provisional set of pixels constituting text can easily be identified.

(5) The image-processing functions provided in the scanner driver 100 of the computer 200 according to the embodiment may instead be provided in a device having an image-reading unit, such as the multifunction peripheral 400 or the scanner 300, or a device having an optical image data generating unit, such as a digital camera. In such cases, a multifunction peripheral or a scanner possessing the image-processing functions may perform image processes on scan data using its own image-reading unit to generate processed image data (such as high-compression PDF data), and may output the processed image data to a personal computer or the like that is connected to and capable of communicating with the multifunction peripheral or the scanner.

In general, the device implementing the image-processing functions of the scanner driver 100 is not limited to the computer 200, but may be a multifunction peripheral, a digital camera, a scanner, or the like. Further, the image-processing functions of the embodiment may be implemented on a single device or may be divided among a plurality of devices connected to each other over a network. In this case, the entire system of devices that implement the image-processing functions corresponds to the image processing device of the present invention.

(6) Part of the processes implemented in hardware in the embodiment may be replaced with software processes, while conversely part of the processes implemented in software may be replaced with a hardware configuration.

While the invention has been described in detail with reference to the embodiment thereof, it would be apparent to those skilled in the art that various changes and modifications may be made therein without departing from the scope of the invention.

What is claimed is:
1. An image processing device comprising:
a processor configured to perform:
acquiring target image data representing a target image including a letter, the target image data including a plurality of component image data corresponding respectively to a plurality of components constituting a color coordinate system; and
generating binary image data representing the letter in the target image by using the target image data, the generating of the binary image data comprising:

identifying a background color value representing color of background of the target image, the background color value being composed of values for the plurality of components;

identifying a letter color value representing color of the letter in the target image, the letter color value being composed of values for the plurality of components;

acquiring a difference between the background color value and the letter color value, the difference including a plurality of component differences corresponding respectively to the plurality of components, each of the plurality of component differences being a difference between a component value that composes the background color value and a component value that composes the letter color value;

selecting, from among the plurality of component image data, one specific component image data corresponding to a specific component from among the plurality of components, the specific component corresponding to a maximum component difference among the plurality of component differences; and performing a binarizing process on the selected one specific component image data to generate one binary image data, as the binary image data representing the letter in the target image.

2. The image processing device according to claim 1, wherein the generating of the binary image data further comprises:

determining a binarizing threshold value by using a component value that composes the background color value and corresponds to the specific component, and a component value that composes the letter color value and corresponds to the specific component, wherein the performing of the binarizing process on the selected one specific component image data is performed by using the determined binarizing threshold value corresponding to the specific component.

3. The image processing device according to claim 1, wherein the generating of the binary image data further comprises:

identifying a pixel group that includes a plurality of pixels configuring the target image excluding pixels having color values in a prescribed range including the background color value, wherein the identifying of the letter color value is performed by using a part of pixels of the pixel group.

4. The image processing device according to claim 1, wherein the target image data represents the target image that is a part of parent image represented by parent image data, wherein the identifying of the background color value is performed by using partial data of the parent image data, the partial data being different from the target image data.

5. The image processing device according to claim 1, wherein the identifying of the letter color value is performed by using the background color value.

6. A non-transitory computer-readable storage medium storing computer-readable instructions that, when executed by a processor, causes an image processing device to perform:

acquiring target image data representing a target image including a letter, the target image data including a plurality of component image data corresponding respectively to a plurality of components constituting a color coordinate system; and generating binary image data representing the letter in the target image by using the target image data, the generating of the binary image data comprising:

identifying a background color value representing color of background of the target image, the background color value being composed of values for the plurality of components;

identifying a letter color value representing color of the letter in the target image, the letter color value being composed of values for the plurality of components;

acquiring a difference between the background color value and the letter color value, the difference including a plurality of component differences corresponding respectively to the plurality of components, each of the plurality of component differences being a difference between a component value that composes the background color value and a component value that composes the letter color value;

selecting, from among the plurality of component image data, one specific component image data corresponding to a specific component from among the plurality of components, the specific component corresponding to a maximum component difference among the plurality of component differences; and performing a binarizing process on the selected one specific component image data to generate one binary image data, as the binary image data representing the letter in the target image.

7. The non-transitory computer-readable storage medium according to claim 6, wherein the generating of the binary image data further comprises:

determining a binarizing threshold value by using a component value that composes the background color value and corresponds to the specific component, and a component value that composes the letter color value and corresponds to the specific component, wherein the performing of the binarizing process on the selected one specific component image data is performed by using the determined binarizing threshold value corresponding to the specific component.

8. The non-transitory computer-readable storage medium according to claim 6, wherein the generating of the binary image data further comprises:

identifying a pixel group that includes a plurality of pixels configuring the target image excluding pixels having color values in a prescribed range including the background color value, wherein the identifying of the letter color value is performed by using a part of pixels of the pixel group.

9. The non-transitory computer-readable storage medium according to claim 6, wherein the target image data represents the target image that is a part of parent image represented by parent image data, wherein the identifying of the background color value is performed by using partial data of the parent image data, the partial data being different from the target image data.

10. The non-transitory computer-readable storage medium according to claim 6, wherein the identifying of the letter color value is performed by using the background color value.

* * * * *